United States Patent Office 2,801,387
Patented July 30, 1957

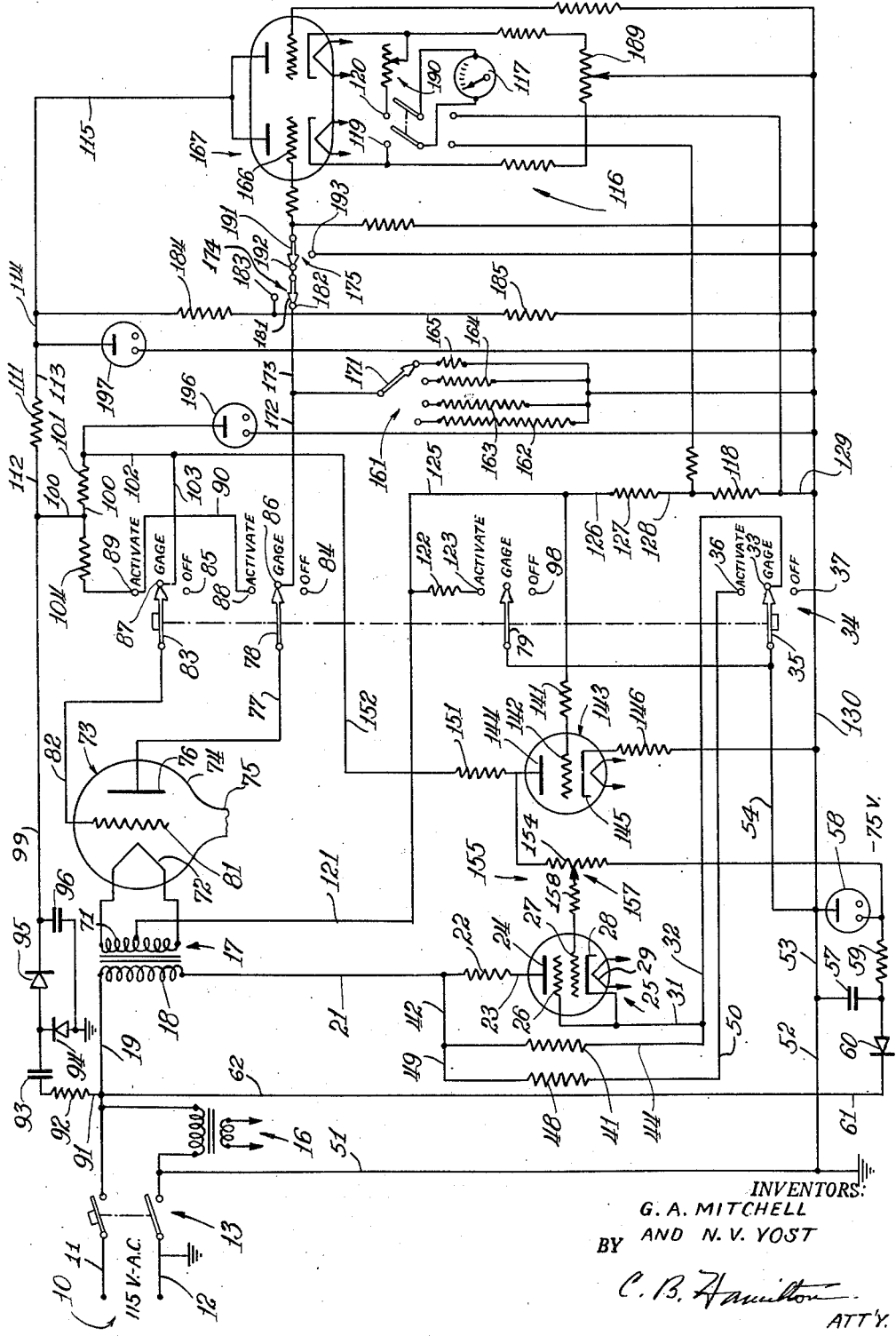

2,801,387
GAS PRESSURE MEASURING DEVICES

Gerald A. Mitchell, White Bear Lake, and Norman V. Yost, St. Paul, Minn., assignors to Western Electric Company, Incorporated, New York, N. Y., a corporation of New York Application January 27, 1954, Serial No. 406,438

5 Claims. (Cl. 324—33)

This invention relates to gas pressure measuring devices, and more particularly to manometer circuits.

In the manufacture of vacuum tubes of types which must be evacuated to a high degree, it is essential to ascertain the pressures in the tubes before sealing off the tubes. Manometer tubes have been used in the past to measure such pressures, but unless expensive, precise, regulated power supplies were used, uniform results in measuring gas pressures were very difficult to obtain.

An object of the invention is to provide new and improved gas pressure measuring devices.

Another object of the invention is to provide new and improved manometer circuits.

A further object of the invention is to provide manometer circuits in which grid currents of manometer tubes are kept constant even though imperefectly regulated power supplies are used.

An apparatus illustrating certain features of the invention may include a manometer tube having a plate, a filament and a grid and an alternating current power supply for creating a current between the grid and the filament of the tube. A thyratron cuts off a portion of each cycle of the power supply, and an inverter amplifier is provided for triggering the thyratron in response to variations in grid current to maintain the current constant for each alternating current cycle.

A complete understanding of the invention may be obtained from the following detailed description of an apparatus forming a specific embodiment of the invention, when read in conjunction with the appended drawings, in which the single figure is a schematic view of an apparatus forming a specific embodiment of the invention.

Referring now in detail to the drawing, there is shown therein an alternating current powerline 10 having a hot conductor 11 and a grounded conductor 12, and a manually operable toggle switch 13 is connected in the powerline. A filament transformer 16 is connected to the switch 13, and a main power transformer 17 has a primary winding 18 connected at one end by a conductor 19 to the conductor 11. The other end of the primary winding 18 is connected by a conductor 21, a resistor 22 and a conductor 23 to a plate 24 of a gas-filled thyratron tube 25 having a shielding grid 26 and a triggering grid 27, a cathode 28 and a filament 29 connected to the filament transformer 16. A conductor 31 connects the grid 26 and the cathode 28 to a conductor 32 connected to a contact 33 of a manually operable switch 34 having a contactor 35 movable selectively into engagement with any one of the contacts 33, a contact 36 and a contact 37.

A resistor 41 is connected by conductors 42, 43 and 44 to the conductors 21 and 32 and parallel with the tube 25, and a resistor 48 having greater resistance than that of the circuit including the resistor 41 and the resistor 22 is connected by conductors 49 and 50 to the conductor 42 and the contact 36. The grounded conductor 12 is connected by conductors 51 and 52, 53 and 54 to the contactor 35 of the switch 34. A circuit including a condenser 57 and a gas-filled tube 58 connected in parallel to a resistor 59 in series with a rectifier 60 forms a negative bias voltage supply, the rectifier 60 being connected to the conductor 11 by a conductor 61.

The ends of a secondary winding 71 of the transformer 17 are connected to a filament 72 of a manometer tube 73 of a well known type, which includes an envelope 74 connected by a conduit 75 to a tube (not shown) such as for example, a magnetron, being evacuated, the gas pressure of which is to be tested. The tube 73 includes a cathode 76 connected by a conductor 77 and a contactor 78 of the switch 34, and also includes a grid 81 connected by a conductor 82 to a contactor 83 of the switch 34. The contactors 35, 78, 83 and 79 may be swung to any selected position in one of which the contactors engage off contacts 37, 84, 85 and 98, in a second position of which the contactors engage gaging contacts 33, 86, 87 and 104 or a third position in which the contactors engage activating contacts 36, 88, 89 and 123, the contacts 88 and 89 being joined by a conductor 90. The conductor 11 is connected to the contact 87 through a conductor 91, a resistor 92, a capacitor 93, rectifiers 94 and 95, a capacitor 96, conductors 99 and 100, resistor 101 and conductors 102 and 103. The contacts 88 and 89 are connected by means of a resistor 104 to the conductors 99 and 100. The capacitors 93 and 96 and the rectifiers 94 and 95 form a voltage doubler circuit, and maintain the voltage on the conductor 99 positive and high.

A protective resistor 111 and conductors 112, 113, 114 and 115 connect the conductor 99 to a D. C. amplifier 116 of a well known type including a meter 117 calibrated in pressure units. The meter 117 can be connected selectively to a checking voltage source 118 or to contacts 119 and 120 of the amplifier 116 to read proportionally to the voltage applied between the terminals of the D. C. amplifier 116.

The center point of the secondary winding 71 is connected by a conductor 121 and a resistor 122 to the contact 123 of the switch 34, and to ground through conductors 121, 125 and 126, a resistor 127, a conductor 128, the resistor 118 and conductors 129 and 130. The conductor 125 is connected by a resistor 141 to a grid 142 of a tube 143 having a plate 144 and a cathode 145. A resistor 146 connects the cathode 145 to ground, and the plate 144 is connected by a resistor 151 and a conductor 152 to the conductor 103 and is connected by a resistor 154 of an adjustable potential divider 155 to the negative bias voltage supply. A contactor 157 of the potential divider 155 connects the grid 27 to the potential divider 155 through a small resistor 158.

A switch 161 may be actuated to bring in any of resistors 162, 163, 164 and 165 of different resistances to control the bias on a grid 166 of a tube 167 of the D. C. amplifier to provide different ranges for the meter 117. A contactor 171 of the switch 161 is connected by a conductor 172 to the contact 86 and by a conductor 173 and manually operable toggle switches 174 and 175 to the grid 166. A contactor 181 of the switch 174 may be moved out of its operative position in engagement with a contact 182 into engagement with a contact 183 connected between a large resistor 184 and a small resistor 185 connected to the conductor 114 and the grounded conductor 130, respectively, to provide a known voltage to the grid 166 for calibrating the meter 117 by adjusting a potentiometer 190, if necessary. A contactor 191 of the switch 175 may be moved from a position engaging a contact 192 to connect the switch 174 to the grid 166 to position engaging a contact 193 connecting the grid 166 to ground to calibrate the meter 117 to zero, if necessary, by adjusting a potentiometer 189. A gas-filled tube 196 is connected between the conductor 102 and ground to keep the voltage on the conductor 102 close to constant.

A gas-filled tube 197 keeps the voltage on the conductor 114 close to constant.

*Operation*

With the switch 34 placed in its "activate" condition and the manometer tube 73 connected to the tube (not shown) which is being evacuated, the switch 13 is closed, and current flows through the primary winding 18 of the transformer 17. This causes a high current to flow from the plate 76 of the tube 73 to the cathode 72 thereof, the plate 76 being disconnected from the amplifier 116 at this time so that no reading is provided on the meter 117. There also is a low resistance path for the primary winding 18 and the grid circuit of the tube 73 so that all the elements of the tube 73 are heated to drive off any air in the cathode 72, the grid 81 and the plate 76. After the tube 73 is baked out or activated, the switch 34 is actuated to its "gage" condition in which the resistor 48 is disconnected from a position in series with the primary winding 18 and the transformer 17, and the thyratron tube 25 and the resistor 41 are connected in parallel to the winding 18, the resistor 41 permitting only a small amount of current to flow through the winding 18 and having much higher resistance than that of the tube 25 and the resistor 22 when the tube 25 is fired. As the alternating current flows through the primary winding 18 of the transformer 17, the voltage induced in the secondary winding 71 thereof creates a potential difference between the filament 72 and the grid 81 which is connected to the conductor 102 of positive and near constant voltage, and current flows therebetween in proportion to the alternating voltage of the powerline 10.

As current flows through the grid circuit including the grounded conductor 130, the resistors 118 and 127, the secondary winding 71, the cathode 72, the grid 81, the resistor 151, the tube 143 and the resistor 146, and the current increases in each cycle, the voltage drop across the resistors 118 and 127 biasing the grid 142 is increasing more rapidly than that across the resistor 146 biasing the cathode 145 and decreases the impedance of the tube 143 to increase current flow therethrough. This lowers the voltage between the grid 27 and ground. Thus, if there is a higher line voltage in the powerline, it tends to increase the grid current of the tube, but the increase of the grid current slows the rise of the voltage on the grid 27 to delay the firing of the tube 25 in each positive half of the cycles to cause less current per cycle to flow through the transformer 17. This decreases the grid current of the tube 73 from what it would be with the increased line voltage and maintains the grid current of the tube 73 constant for each cycle regardless of variations in voltage of the powerline 10, it being essential that this grid current be constant in order for the manometer tube 73 to be an accurate measuring device of the air pressure therein.

If the voltage of the powerline 10 drops, the voltage on the plate 144 of the tube 143 drops to cause the voltage of the grid 27 to increase more rapidly during each operative half cycle whereby the tube 25 is fired earlier in that half cycle to keep the grid current of the tube 73 constant. The current between the plate 76 and the cathode 72 is proportional to the gas pressure in the tube 73, and the grid current being constant, actuates the D. C. amplifier 116 through the grid 166 of the tube 167 thereof, and this amplification is applied to the meter 117, which indicates the extent of ionization in the tube 73 which is proportional to the gas pressure therein.

The resistor 41 permits current to flow through the primary winding 18, but only small amounts relative to the current flowing through the thyratron tube 25 when it has been triggered in each cycle. Thus, the resistor 41 does not greatly effect the valving action of the tube 25, but does permit reverse current in the transformer primary winding 18. Since the inverter amplifier circuit including the voltage divider 155 controls the firing of the thyratron tube 25 inversely with respect to the voltage of the powerline 10, the grid current of the tube 73 is kept constant and any fluctuations in the plate current of the tube 73 are from a variation in the pressure of the air inside the tube 73. Hence, the reading of the meter 117 is proportional to the air pressure variations and is independent of fluctuations of voltage of the powerline 10.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gas pressure measuring device, which comprises a manometer tube having an anode, a cathode and a grid, an alternating current power supply, a transformer having a primary winding and a secondary winding, means including a cold cathode tube and an impedance connected in parallel therewith connecting the primary winding to the power supply, means connecting the ends of the secondary winding of the transformer to the ends of the cathode, a resistor, a D. C. voltage source, means connecting the grid, the midpoint of the secondary winding and the resistor in series with the D. C. voltage source, a second resistor, a vacuum tube having a plate and a cathode connected in series with the second resistor and the D. C. voltage source and a grid connected between the grid of the manometer tube and the first resistor, means connecting the control electrode of the cold cathode tube to the plate of the vacuum tube, and means responsive to plate current of the manometer tube for measuring the ionization in the tube.

2. A gas pressure measuring device, which comprises an alternating current powerline having a hot conductor and a grounded conductor, a voltage doubler means connected to the hot conductor, a transformer having a primary winding connected at one end to the hot conductor and a secondary winding, a manometer tube having a filament-cathode connected to the ends of the secondary winding, a plate, a grid and an envelope adapted to be connected to an article to be evacuated, a thyratron tube having a plate connected to the other end of the primary winding and a firing electrode, a vacuum tube having a plate connected to the grid of the manometer tube and the voltage doubler means, a cathode and a grid, impedance means connecting the midpoint of the secondary winding and grid of the vacuum tube to ground, whereby the potential on the grid of the vacuum tube varies as the current through the grid circuit varies, impedance means connecting the cathode of the vacuum tube to ground and being of such a value relative to said first-mentioned impedance means that the voltage on the grid of the vacuum tube increases as the grid current of the manometer tube increases to decrease the plate voltage of the vacuum tube, voltage divider means connecting the firing electrode of the thyratron tube to the plate of the vacuum tube and ground so that the thyratron tube is fired later in each cycle when the plate voltage of the vacuum tube is lower, and means for measuring the plate current of the manometer tube.

3. A gas pressure measuring device, which comprises an alternating current powerline having a hot conductor and a grounded conductor, voltage doubler means connected to the hot conductor, a transformer having a primary winding connected at one end to the hot conductor and a secondary winding, a manometer tube having a filament-cathode connected to the ends of the secondary winding, a plate, a grid and an envelope adapted to be placed in communication with an article to be evacuated, a cold cathode tube having a plate connected to the other end of the primary winding, a cathode connected to ground and a firing electrode, a vacuum tube having a plate connected to the grid of the maometer tube and the voltage doubler means, a cathode and a grid, resistance means connecting the midpoint of the secondary winding and the grid of the vacuum tube to ground, resistance means connecting the cathode of the vacuum tube to ground and being of such a value relative to said first-mentioned resistance means that the voltage on the grid of the vacuum tube increases as the grid current of the manometer tube increases to decrease the plate voltage of the vacuum tube, voltage divider means connecting the firing electrode of the cold cathode tube to the plate of the vacuum tube and ground so that the thyratron tube is fired later in each cycle when the plate voltage of the vacuum tube is lower, and means for measuring the plate current of the manometer tube.

4. A gas pressure measuring device, which comprises an alternating current powerline having a hot conductor and a grounded conductor, a transformer having a primary winding connected at one end to the hot conductor and a secondary winding, a manometer tube having a filament-cathode connected to the ends of the secondary winding, a plate, a grid and an envelope adapted to be connected to an article being evacuated, a cold cathode tube having a plate connected to the other end of the primary winding, a cathode connected to ground and a firing electrode, impedance means connected to the primary winding and ground in parallel with the cold cathode tube, a D. C. voltage source for applying a potential to the grid and the cathode of the manometer tube, inverter-amplifier means responsive to current through the grid for actuating the firing electrode, and means for measuring the plate current of the manometer tube.

5. A gas pressure measuring device, which comprises an alternating current powerline having a hot conductor and a grounded conductor, voltage doubler means connected to the hot conductor, a transformer having a primary winding connected at one end to the hot conductor and a secondary winding, a manometer tube having a filament-cathode connected to the ends of the secondary winding, a plate, a grid and an envelope adapted to be connected to an article to be evacuated, a thyratron tube having a plate connected to the other end of the primary winding, a cathode connected to ground and a firing electrode, a vacuum tube having a plate connected to the grid of the manometer tube and the voltage doubler means, a cathode and a grid, impedance means connecting the midpoint of the secondary winding and the grid of the vacuum tube to ground, whereby the potential on the grid of the vacuum tube varies as the current through the grid circuit varies, impedance means connecting the cathode of the vacuum tube to ground and being of such a value relative to said first-mentioned impedance means that the voltage on the grid of the vacuum tube increases as the grid current of the manometer tube increases to decrease the plate voltage of the vacuum tube, voltage divider means connecting the firing electrode of the cold cathode tube to the plate of the vacuum tube and ground so that the thyratron tube is fired later in each cycle when the plate voltage of the vacuum tube is lower, means for measuring the plate current of the manometer tube, and selectively operable means for shunting the cold cathode tube to decrease the impedance in the circuit including the primary winding and connecting the plate of the manometer tube to the voltage doubler means.

References Cited in the file of this patent
UNITED STATES PATENTS

| 2,442,518 | Stratton | June 1, 1948 |
| 2,537,775 | MacNeille | Jan. 9, 1951 |

OTHER REFERENCES

Review of Scientific Instruments, vol. 13, 1942, pages 215–217, article by Nelson et al.